E. A. WOOD.
Air-Valve.

No. 202,130. Patented April 9, 1878.

Attest:
Morris H Aylsworth
William E Wood

Inventor.
Edwin A Wood

UNITED STATES PATENT OFFICE.

EDWIN A. WOOD, OF UTICA, NEW YORK.

IMPROVEMENT IN AIR-VALVES.

Specification forming part of Letters Patent No. 202,130, dated April 9, 1878; application filed December 13, 1877.

*To all whom it may concern:*

Be it known that I, EDWIN A. WOOD, of Utica, Oneida county, and State of New York, have invented a new and Improved Air-Valve, designed to relieve steam pipes and radiators of confined air, and to close when all the air has been expelled, of which the following is a full, clear, and exact description, reference being had to the accompanying drawings, making a part of this specification, in which—

Figure 1:
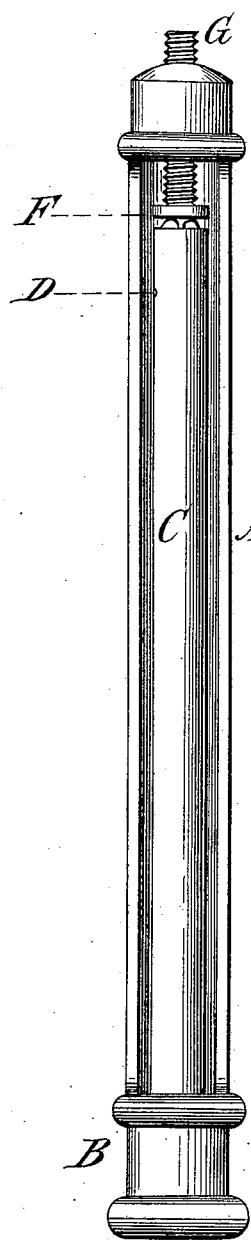
Figure 2:
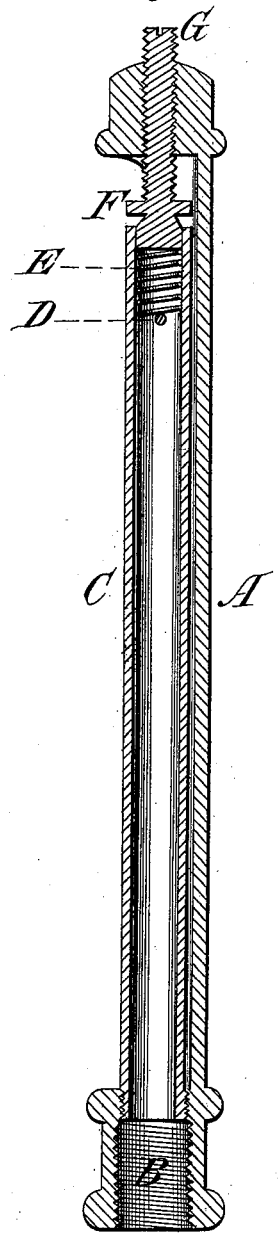

Figure 1 is a perspective view, and Fig. 2 is a sectional view.

A is an iron yoke or casing, having a hole drilled and tapped through it at B, its lower extremity, by which connection is made with the steam pipe or radiator. In the upper portion of this hole, and within the yoke or case, is screwed the brass pipe C, which extends nearly the whole length of the yoke or case, and which has a small pin, D, put through it at its upper end, which holds in place a spring, E, preferably within the brass tube C, which spring serves to keep a valve, F, from remaining in contact with its seat on the end of pipe C, (which it fits steam-tight,) except when it is forced down by the set-screw G, which passes through the upper end of iron case or yoke A.

The operation of this instrument is as follows: It is connected with the steam pipe or radiator by the screwed end B. The set-screw G is turned backward, so as to let valve F respond to the pressure of the spring E, or of the confined air within the steam pipe or radiator, and to lift from its seat, letting out the confined air when steam is let on. As soon as the air has been expelled from pipe C, steam will fill the pipe and heat it, expanding it. After steam has completely filled the steam pipe or radiator, the valve F is then forced down to its seat on the end of pipe C by turning the set-screw G, and so long as the pipe C is hot the valve will remain tight. The yoke or case A, being of iron and exposed to the air, will expand but slightly, and the expansion will not affect the working of the instrument.

When steam is shut off from the steam pipe or radiator, and it cools off, brass pipe C will contract and be drawn away from valve F, allowing air to pass in, to be again expelled when steam is let on, and the air-valve will work with no further attention than the first adjustment.

I claim the following advantages for this arrangement:

First, simplicity and cheapness—the parts being few and inexpensive.

Second, capacity for relieving quickly a large amount of steam-pipe of confined air. The valve being seated on the end of the brass pipe, a large opening is made by a slight contraction of the pipe, and the size of this opening can be varied with the size of the brass pipe used.

Third, positive action. The expansion and contraction of the brass pipe by heat and cold being sure, the valve, being loose and moving with the pipe, will certainly seat tight when forced down by set-screw G. It is made loose, so as to readily and perfectly adjust itself to its seat, which it would not do if it were made a fixed part of the set-screw G. It will so adjust itself although the brass pipe C might be somewhat sprung or bent to one side.

Fourth, I secure a large opening (which may be increased at pleasure) for the expulsion of the air, depending more on the size or area of the valve than on the amount of the contraction or expansion of pipe C, or any multiplication of that contraction or expansion.

Fifth, automatic action of the instrument after its first adjustment.

I am aware that the idea of operating air-valves by expansion and contraction of brass tubes is not new; but

I claim—

The spring E, in combination with case or yoke A, expanding pipe C, valve F, and set-screw G, or their equivalents.

EDWIN A. WOOD.

Witnesses:
FRANCIS G. WOOD,
MORRIS H. AYLSWORTH.